US010990965B2

(12) United States Patent
Leyva

(10) Patent No.: US 10,990,965 B2
(45) Date of Patent: Apr. 27, 2021

(54) SINGLE SIGN-ON USING A SECURE AUTHENTICATION SYSTEM

(71) Applicant: Visa International Service Association, San Francisco, CA (US)

(72) Inventor: Raul Leyva, Round Rock, TX (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 641 days.

(21) Appl. No.: 14/979,279

(22) Filed: Dec. 22, 2015

(65) Prior Publication Data

US 2016/0180333 A1 Jun. 23, 2016

Related U.S. Application Data

(60) Provisional application No. 62/096,034, filed on Dec. 23, 2014.

(51) Int. Cl.
| | |
|---|---|
| G06Q 20/36 | (2012.01) |
| G06Q 20/40 | (2012.01) |
| G06Q 20/42 | (2012.01) |
| H04L 29/06 | (2006.01) |
| G06Q 20/38 | (2012.01) |
| G06F 21/41 | (2013.01) |

(52) U.S. Cl.
CPC ........... *G06Q 20/363* (2013.01); *G06F 21/41* (2013.01); *G06Q 20/3821* (2013.01); *G06Q 20/4014* (2013.01); *G06Q 20/42* (2013.01); *H04L 63/0815* (2013.01)

(58) Field of Classification Search
None
See application file for complete search history.

(56) References Cited

U.S. PATENT DOCUMENTS

| | | | |
|---|---|---|---|
| 7,636,941 B2 | 12/2009 | Blinn et al. | |
| 8,572,391 B2 | 10/2013 | Golan et al. | |
| 8,667,558 B2 | 3/2014 | Boulos et al. | |
| 2011/0270773 A1* | 11/2011 | Siekman | G06Q 10/20 705/305 |
| 2013/0041822 A1* | 2/2013 | Wagner | G06Q 20/40 705/44 |
| 2013/0110658 A1* | 5/2013 | Lyman | G06Q 20/327 705/18 |
| 2013/0191227 A1* | 7/2013 | Pasa | G06Q 20/367 705/14.73 |

(Continued)

*Primary Examiner* — Steven S Kim
*Assistant Examiner* — Timothy Paul Sax
(74) *Attorney, Agent, or Firm* — Kilpatrick Townsend & Stockton LLP

(57) ABSTRACT

One embodiment of the invention is directed to a method comprising, establishing, by a wallet server computer, a single sign-on link between a user bank account and a wallet application. The method further comprises receiving a transaction request message from a user, wherein the transaction request is for a transaction between the user and a merchant associated with the wallet application. The method further comprises sending sign-on data to an issuer computer using a secure authentication protocol and receiving a confirmation message from the issuer computer confirms initiation through the issuer application. The transaction is processed by the wallet server computer based on the confirmation message.

18 Claims, 8 Drawing Sheets

(56) References Cited

U.S. PATENT DOCUMENTS

| | | | | |
|---|---|---|---|---|
| 2013/0298215 A1* | 11/2013 | Kuznetsov | ............... | G06F 21/41 |
| | | | | 726/8 |
| 2014/0108247 A1* | 4/2014 | Artman | ................. | H04W 76/10 |
| | | | | 705/44 |
| 2014/0279477 A1* | 9/2014 | Sheets | ..................... | G06Q 40/02 |
| | | | | 705/41 |
| 2014/0380426 A1* | 12/2014 | Lin | ......................... | G06F 21/31 |
| | | | | 726/4 |
| 2015/0120473 A1* | 4/2015 | Jung | ....................... | G06Q 20/40 |
| | | | | 705/17 |
| 2015/0134518 A1* | 5/2015 | Turovsky | ................ | G06Q 20/12 |
| | | | | 705/41 |

* cited by examiner

SINGLE SIGN-ON USING A SECURE AUTHENTICATION SYSTEM

CROSS-REFERENCES TO RELATED APPLICATIONS

This application claims the benefit of the filing date of U.S. Provisional Application No. 62/096,034, filed on Dec. 23, 2014, which is incorporated by reference in its entirety for all purposes.

BACKGROUND

Embodiments of the invention are directed to systems and methods related to utilizing the infrastructure of a secure authentication system for performing authentications.

The Internet has made it increasingly easy for consumers to conduct electronic commerce and online purchases using computing devices—such as mobile devices (e.g., mobile phones, tablet computers, etc.). However, it has also increased the risks of fraudulent transactions, as well as the risk of data being compromised. Transactions conducted over the Internet, using a merchant website or mobile application, can make it difficult for a merchant or payment processing network to know whether the user conducting the transaction is the actual cardholder or account holder. Thus, systems have been established to perform authentication processing.

In current solutions, when a consumer conducts a transaction with a merchant that uses a secure authentication system, the consumer is presented with a challenge question that requires the consumer to correctly respond to the challenge question before the transaction can proceed. This is meant to ensure that the person engaging in the transaction is authenticated.

The process may be improved. One challenge related to processing consumer transactions is that the challenge process creates friction for the user. For example, during a transaction the user may be challenged with a question, the user may respond, and the response may be validated allowing the transaction process to proceed. In some cases, even though the consumer may have previously performed a successful authentication with an issuer, merchant, or other system, the consumer may have to perform an additional authentication process to complete a transaction. Some users are sensitive to interruptions in their purchase transactions. Thus, delaying the transaction to challenge the user with a question and/or challenging the user twice in the same transaction, may lead to a transaction being abandoned. The consumer may abandon, in some cases, because the consumer is unwilling to endure the delay or, perhaps, unable to recall a previously-established password.

Thus, there is a need for new and enhanced methods of performing an authentication process for a transaction that utilizes a secure authentication infrastructure and that are more efficient by leveraging prior authentications performed by a consumer.

BRIEF SUMMARY

Embodiments of the invention address these and other problems, individually and collectively.

One embodiment of the invention is directed to a method comprising, receiving, by a server computer through an issuer application, a transaction request message from a user, wherein the transaction request is for a transaction between the user and a merchant associated with the wallet application. The method further comprises sending, by the server computer, sign-on data to an issuer computer using a secure authentication protocol and receiving a transaction response message from the issuer computer authorizing the transaction associated with the transaction request message. The transaction is processed by the server computer based on the transaction response message.

Another embodiment of the invention is directed to a method comprising, receiving, by a directory server computer, a payer authentication request message for a transaction between a user and a merchant. The method further comprises sending, by the directory server computer, the payer authentication request message to an access control server at an issuer, wherein the access control server challenges the user with one or more online banking questions. The method further comprises receiving, by the directory server from the access control server, a payer authentication request. The method further comprises forwarding, by the directory server, the payer authentication response to the merchant These and other embodiments of the invention are described in further detail below.

DETAILED DESCRIPTION

Figure 1:
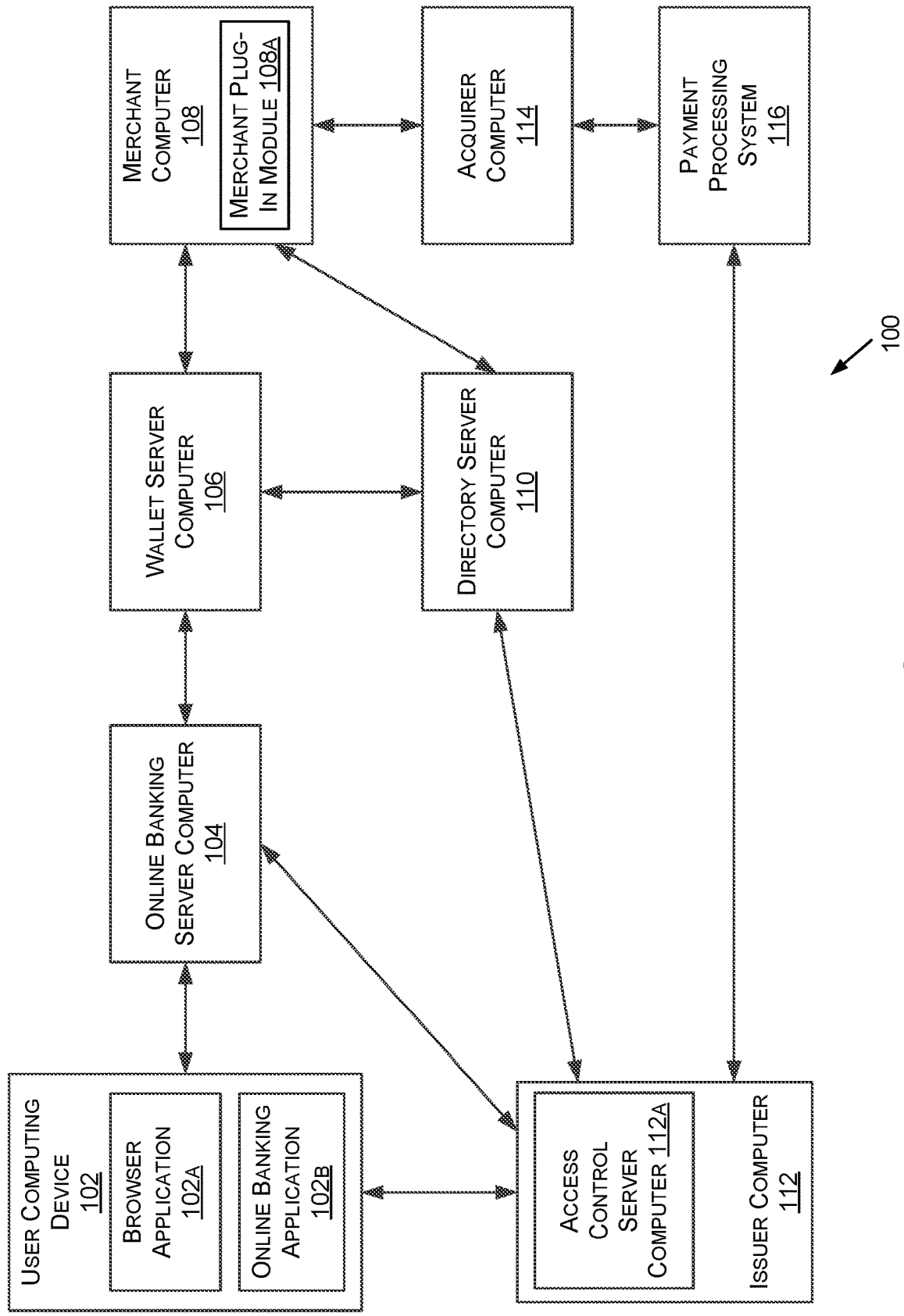
FIG. 1 shows a block diagram of a system according to an embodiment of the invention.

Embodiments of the present invention may be directed at utilizing the infrastructure of a secure authentication system for performing authentications. In some embodiments of the present invention, a user may link an online banking account with a digital wallet to allow transactions to be conducted through a secure authentication system without requiring the user to perform multiple authentication processes once they have logged into their online banking account. In such embodiments, once the user has been authenticated through their online banking account, the user can perform a transaction without being prompted by their digital wallet to provide a response to a challenge question (e.g., a password).

In other embodiments of the present invention, when transactions are processed through the secure authentication system, and the user is presented with a challenge, the format and the information used in the challenge process may be challenge question/responses previously established with the user's online banking account. Thus, rather than being prompted to provide a user name and password, which the user may forget, the secure authentication system will present challenge questions associated with the user's account. Example challenge questions may request information including the user's mother's maiden name, city of birth, address of childhood home, etc. Additionally, challenge questions may query the user with questions regarding previous banking transactions. For example, the user may be asked to indicate a merchant with whom they have recently completed a transaction from a list of merchants. Utilizing challenge questions such as those discussed above provides the ability to authenticate a user without the user being required to remember a password.

Embodiments of the present invention may use an existing secure authentication environment (e.g., Verified by Visa™, MasterCard SecureCode™, American Express SafeKey™).

Embodiments of the present invention may be used in transaction processing systems or may use data generated during transaction processing through a transaction processing system. Such embodiments may involve transactions between consumers and merchants.

Before discussing detailed embodiments of the invention, some descriptions of certain terms may be useful.

A "computing device" may be any suitable device that can perform computations, and that can communicate with other devices. A mobile device is an example of a computing device. Other types of computing devices may not be mobile.

A "mobile device" may comprise any electronic device that may be transported and operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of mobile devices include mobile phones (e.g., cellular phones), PDAs, tablet computers, net books, laptop computers, personal music players, hand-held specialized readers, wearable devices (e.g., watches), vehicles (e.g., cars), etc. A mobile device may comprise any suitable hardware and software for performing such functions, and may also include multiple devices or components (e.g., when a device has remote access to a network by tethering to another device—i.e., using the other device as a relay—both devices taken together may be considered a single mobile device).

A "transaction request message" may be an electronic message that indicates that the user has initiated a transaction, such as with a merchant.

A "confirmation message" may be an electronic message that confirms an event. In some embodiments, it may be an electronic message that is sent from an issuer computer (or a component of an issuer computer) that confirms receipt of sign-on data that indicates initiation of a transaction through an issue application provided by the issuer.

"Sign-on data" may include information related to a single sign-on account. The sign-on data may include a sign-on identifier associated with an online banking account of the user. The sign-on identifier may include, but is not limited to, a username, an email address of the user, an online banking account number associated with the user, etc. In some cases, the sign-on data may include a session identifier that is a unique number (e.g., an alphanumeric code generated using a hash function) that a web site's server assigns a particular user for the duration of the user's visit/session. In some examples, the sign-on data includes an issuer identifier that identifies the issuer associated with a payment account user in a transaction. For example, a bank identification number (BIN) may be utilized (e.g., ascertained from the first six numbers of a 16 digit credit card number) as an issuer identifier. Additionally, or alternatively, the issuer identifier may include a bank routing number, a bank name, and/or an email address.

"Digital wallet data" may include information pertaining to a digital wallet account. In some examples, digital wallet data may include a digital wallet identifier that includes a unique identifier associated with the digital wallet account. A digital wallet identifier may be any suitable alphanumeric code, an email address, a name, etc. In at least one example, the presence of digital wallet data in a transaction request indicates that a transaction has been initiated subsequent to the user signing into his online bank account (e.g., via a website provided by an issuer).

A "transaction authentication protocol" may include a set of communication rules that define interactions and formatting of communications for receiving and transmitting messages (e.g., in a secure authentication system) pertaining to authentication of a user or a device. In at least one example, an issuer computer may utilize a transaction authentication protocol to authenticate a user during a transaction.

A "secure authentication system" may include one or more computing devices (e.g., servers) that provide secure authentication with respect to a transaction. In at least one example, a secure authentication system includes a directory server computer, a merchant plug-in module, and an access control server computer.

An "issuer application" may be a software application (e.g., operating on a server) that is provided by an issuer (e.g., a bank).

A "wallet application" may be a software application that is provided to perform a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

A "payer authentication request message" may be an electronic message that is used to request authentication of a user using authentication data.

"Authentication data" may include any data suitable for authenticating a user or mobile device. Authentication data may be initially obtained from a user or a device that is operated by the user. Examples of authentication data obtained from a user may include PINs (personal identification numbers), passwords, etc. Examples of authentication data that may be obtained from a device may be include device serial numbers, hardware secure element identifiers, device fingerprints, biometric information of the user, phone numbers, IMEI numbers, etc.

An "authorization request message" may be an electronic message that is used to authorize a payment for a financial transaction. In some examples, an authorization request message is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may refer to any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

An "online banking account" may be an account in a bank that can be accessed online. An online banking account can store user profile information, payment account information, bank account information, and/or the like.

I. Systems

FIG. 1 shows a block diagram of a system 100 according to an embodiment of the invention. The system 100 includes a user computing device 102, an online banking server computer 104, a wallet server computer 106, a merchant computer 108, a directory server computer 110, an issuer computer 112, an acquirer computer 114, and a payment processing system 116. Each of these systems and computers may be in operative communication with each other. For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

The user computing device 102 may have any suitable characteristics. The user computing device 102 may include a processor and a computer readable medium coupled to the processor, the computer readable medium comprising code, executable by the processor for performing the functionality described herein. The user computing device 102 may be communicatively coupled to the merchant computer 108 via a communications medium in order to conduct a transaction with a merchant associated with the merchant computer 108. In some embodiments, the user computing device 102 may be in communications with a merchant computer 108 through a wallet server computer 106.

The user computing device 102 may be in any suitable form. Example of user computing device 102 includes any device capable of accessing the Internet, such as a personal computer, cellular or wireless phones, personal digital assistants (PDAs), tablet computers, laptop computers, and handheld specialized readers. The user computing device 102 may transmit data through the communications medium to the online banking server computer 104, wallet server computer 106 and/or the merchant computer 108. In some embodiments of the invention, the user computing device 102 and a payment device associated with the user may be a single device (e.g., a mobile phone).

In some embodiments, the user computing device 102, the user computing device 102 may include a browser application 102A and/or an online banking application 102B stored in the memory element and configured to retrieve, present, and send data across a communications network (e.g., the Internet). The browser application 102A and/or the online banking application 102B may be used to access an online banking account associated with the issuer computer 112, or an online banking server computer 104, or a wallet server computer 106 or merchant computer 108 to perform a transaction.

The online banking server computer 104 may be one or more computers provided by an issuer entity (e.g., a bank). In some embodiments, the online banking server computer 104 may manage and provide services to a user or consumer related to an online banking account. The services may be provided to the user via an application associated with the online banking server computer 104 (e.g., online banking application 102B) and stored a user's computer device (e.g., the user computing device 102). The online banking server computer 104 may send over-the-air (OTA) messages to an application (e.g., the online banking application 102B) stored on the user computing device 102. In at least one example, the online banking server computer 104 may be responsible for providing one or more network pages associated with the issuer entity. The online banking server computer 104 may be accessed via an issuer-operated website accessible to the user computing device 102. This website may be configured to be accessible from an application (e.g., a browser application, an online banking application, etc.) operating on the user computing device 102. The online banking application may be configured to receive and transmit online banking data using one or more service calls. For example, the online banking server computer may be configured to handle service call requests from an application operating on the user computing device 102 (e.g., the browser application 102A and/or the online banking application 102B). The online banking server computer 104 may serve, in response to received requests, various user interfaces that may be rendered at the user computing device 102 (e.g., via the browser application 102A, the online banking application 102B, etc.).

The online banking server computer 104 may transmit and receive data through the communications medium to the user computing device 102, the wallet server computer 106, the access control server computer 112A, and/or the issuer computer 112. The online banking server computer 104 can be a large mainframe, a minicomputer cluster, or a group of servers functioning as a unit. In one example, the online banking server computer 104 may be a database server coupled to a Web server. The online banking server computer 104 may contain communication connections that allow the online banking server computer 104 to communicate with an issuer computer to exchange banking data (e.g., user account information, transaction information, etc.).

In some embodiments, the online banking server computer 104 may receive a request from the user via the user computing device 102, via an application on the user computing device 102, including a transaction request message for a transaction conducted by the user. In at least one example, the transaction request message relates to a transaction between the user and a merchant associated with a wallet application. The online banking server computer 104 may then transmit the transaction request message to the wallet server computer 106. The online banking server computer 104 may subsequently receive and send a transaction response message from the wallet server computer 106 to the user computing device 102.

The wallet server computer 106 may manage and provide services to a user or consumer. In some embodiments, the services may be provided to the user via a mobile application associated with the wallet server computer 106 and stored on a user computing device 102. The wallet server computer 106 may send and receive over-the-air (OTA) messages to the mobile application stored on the user computing device 102. In other embodiments, the wallet server computer 106 may be accessed via a merchant website stored on the merchant computer 108 and accessible via the user computing device 102.

In some embodiments, the wallet server computer 106 may send and receive messages between the online banking server computer 104 and the issuer computer 112. In some embodiments, the wallet server computer 106 may receive a request from the user via the user computing device 102, an application on the user computing device 102, and the online banking server computer 104, including a transaction request message for a transaction conducted by the user. In at least one example, the transaction request message relates to a transaction between the user and a merchant associated with a wallet application. The wallet server computer 106 may then transmit the transaction request message to the issuer computer 112. The wallet server computer 106 may subsequently receive a confirmation message from the issuer computer 112 and send the confirmation message to the user computing device 102 via online banking server computer 104 or directly to the user computing device 102.

The wallet server computer 106 may be associated with a digital wallet account that can store user profile information, payment account information, bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

The merchant computer 108 may include any suitable computational apparatus operated by a merchant. The merchant computer 108 may include a processor and a computer readable medium coupled to the processor, the computer readable medium comprising code, executable by the processor for performing the functionality described herein. Examples of merchant computer 108 may include an access device or a point of sale device. In some embodiments, the merchant computer 108 may include a web server computer that may host one or more websites associated with the merchant. In some embodiments, the merchant computer 108 may be configured to send data to an access control server computer 112A via a wallet server computer 106 or via a directory server computer 110 as part of a payment verification and authentication process for a transaction between the user (e.g., consumer) and the merchant. The merchant computer 108 may also be configured to generate authorization request messages for transactions between the merchant and user, and route the authorization request messages to an issuer computer 112 for additional transaction processing. The messages sent by the merchant computer 108 may be sent by a merchant plug-in module 108A, which may function as a proxy between the merchant computer 108 and the issuer computer 112 or other components within the system.

The directory server computer 110 may be a server computer configured to route messages between two computers. For example, the directory server computer 110 may route messages from the wallet server computer 106 and the merchant computer 108 to the access control server computer 112A or issuer computer 112, as well as messages from the access control server computer 112A or issuer computer 112 to the wallet server computer 106 and the merchant computer 108. In other embodiments, the directory server computer 110 may route verify enrollment request and response messages, as well as authentication request and response messages between the wallet server computer 106 or the merchant computer 108 and the issuer computer 112. In some embodiments, the directory server computer 110 may be operated by a same entity that operates the payment processing system 116.

The issuer computer 112 is typically associated with a business entity (e.g., a bank) which issues and maintains consumer accounts for a consumer. The issuer computer 112 may issue payment devices for the consumer account, including credit cards and debit cards, and/or may provide consumer accounts stored and accessible via the mobile device of the consumer. The issuer computer may include an access control server computer 112A.

The access control server computer 112A may comprise a server computer that may be configured to conduct authentication and authorization processes. The access control server computer 112A may be associated with an issuer, which can be any bank that issues and maintains a financial account for a cardholder. The access control server computer 112A may validate (or authenticate) passwords, PIN numbers, or challenge responses associated with the cardholder or user, and an account associated with the cardholder or user. The access control server computer 112A may use the PAN, computing device data, payment device data, geolocation data, consumer data, transaction data, account data, or other comparable data, in order to authenticate the cardholder and PAN. In some embodiments, at the time of a transaction, the access control server computer 112A may further perform user authentication, and may provide digitally signed responses to the merchant computer 108 through the directory server computer 110. In other embodiments, the access control server computer 112A may send responses back directly to the user computing device 102. In some embodiments, the functions of the access control server computer 112A may be performed by the payment processing system 116.

The acquirer computer 114 is typically associated with a business entity (e.g., a commercial bank) that has a business relationship with a particular merchant or other entity and that may be involved in the process of transaction. The acquirer computer 114 may issue and manage accounts for merchants and exchange funds with the issuer computer 112 on behalf of the merchant. Some entities can perform both issuer computer 112 and acquirer computer 114 functions. Embodiments of the present invention encompass such single entity issuer-acquirer computers. The payment processing system 116 may provide transaction authorization and clearing and settlement services between the acquirer computer 114 and the issuer computer 112 for standard payment transactions.

The payment processing system 116 may be a network that includes or operates at least one server computer used for payment processing. The server computer in the payment processing system 116 may include a processor and a computer readable medium coupled to the processor, the computer readable medium comprising code, executable by the processor for performing the functionality described herein. In some embodiments, the server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, the payment processing system 116 may operate multiple server computers. In such embodiments, each server computer may be configured to process transaction for a given region or handles transactions of a specific type based on transaction data.

The payment processing system 116 may include data processing subsystems, networks, and operations used to support and deliver authorization services, exception file services, and clearing and settlement services. An exemplary payment processing system 116 may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing network may use any suitable wired or wireless network, including the Internet.

The payment processing system 116 may process transaction request messages and determine the appropriate destination (e.g., issuer computer) for the transaction request messages. The payment processing network may also handle and/or facilitate the clearing and settlement of transactions.

In embodiments of the present invention, a server or computer can be a powerful computer or a cluster of computers. For example, the server computer can be a large mainframe, a minicomputer cluster, or a group of servers functioning as a unit. In one example, the server computer may be a database server coupled to a Web server.

II. Methods

A. Enhancement to Secure Authentication Using a Single Sign-on Process

Figure 2:
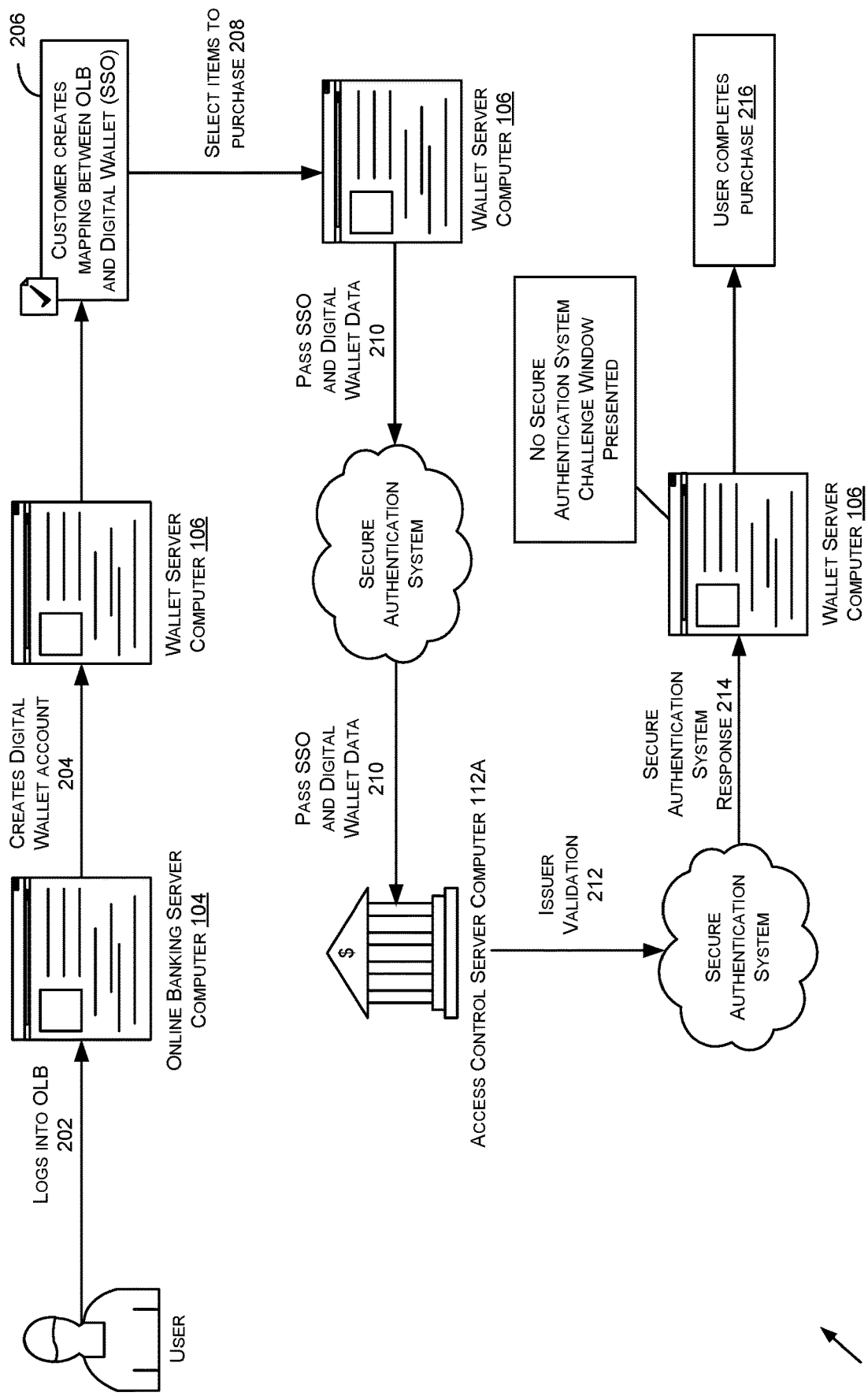
FIG. 2 shows a flow diagram of a method of establishing a single sign-on and utilizing single sign-on data to perform a transaction according to an embodiment of the invention.

FIG. 2 shows a flow diagram of a method 200 of establishing a single sign-on and utilizing the single sign-on to perform a transaction using a secure authentication system according to an embodiment of the invention. Additional methods and processes may be included within these methods and may be recognized by one of ordinary skill in the art, in light of the description below. Further, in some embodiments of the present invention, the described methods may be combined, mixed, and matched, as one of ordinary skill would recognize.

At step 202, the user logs onto their online banking (OLB) account. In some embodiments, the user may log into a website hosted by the online banking server computer 104 (associated with an issuer) using a browser application 102A or access an online banking application 102B stored on a user computing device 102. In some embodiments, when the user has logged into their online banking account, the online banking server computer 104 may cause the user to be presented with options to create or access a digital wallet account. The user may select the option to create or access the digital wallet account.

At step 204, utilizing an interface provided by the wallet server computer 106, the user may establish or create a digital wallet account associated with a wallet server computer 106 by entering user account information such as a username, password, and/or payment information for a payment account to be utilized by the wallet server computer 106 for transactions. In another embodiment, the user may utilize an interface provided by the online banking server computer 104 to establish or create a digital wallet account associated with the wallet server computer 106. The online banking server computer 104 may send user account information to the wallet server computer 106 in order to cause the wallet server to create a digital wallet account. The wallet server computer 106 may store the user account information entered by the user. In some embodiments, the user may have a previously-established digital wallet account. In such embodiments, the user may be prompted by the wallet server computer 106 to provide their login information to access their digital wallet account.

At step 206, a single sign-on mapping may be created by the wallet server computer 106 to maintain an association between the online banking account and the digital wallet account. The mapping between the online banking account and the digital wallet account may be established by a selection or confirmation by the user to link the two accounts. In addition, as part of the mapping process, the payment account data associated with the online banking account may be transferred by the online banking server computer 104 to the wallet server computer 106 to be stored. In some embodiments, the payment account data may be received by the wallet server computer 106. The mapping process may also include linking a user identifier (or consumer identifier) with an issuer identifier associated with the online banking account. This may facilitate the identification of the user by the access control server computer 112A.

At step 208, once the user has been enrolled and the single sign-on has been established, the user may utilize an interface provided by the online banking server computer 104 to select goods or services of a merchant and initiate a checkout process for a transaction. In some embodiments, the online banking server computer 104 may direct the user computing device 102 to a listing of merchants accessible through the digital wallet account. In some embodiments, a digital wallet interface provided by the wallet server computer 106 may be displayed, for example, via a website provided by the online banking server computer 104 (e.g., as a pop-up window). The digital wallet interface may confirm the transaction details for submission and indicate that the transaction is being sent to the access control server computer 112A through a secure authentication system as described below. In other embodiments, the digital wallet interface may not be displayed, but the transaction may proceed as described below.

At step 210, the wallet server computer 106 may send the single sign-on data and digital wallet data to the access control server computer 112A. In some embodiments, the single sign-on data and digital wallet data is sent to the access control server computer 112A using a transaction authentication protocol. In some embodiments, the single sign-on data may include a single sign-on identifier (e.g., a user identifier) or a session identifier. The single sign-on data may also include an issuer identifier that identifies the issuer associated with the payment account used in the transaction. The digital wallet data may include a digital wallet identifier that indicates that the transaction is being initiated following the user logging into the online banking account associated with the issuer.

In some embodiments, the wallet server computer 106 may send the single sign-on data and digital wallet data to the access control server computer 112A through a secure authentication system (e.g., which may include the directory server computer 110). One or more messages including a payer authentication request message may be used to transmit the single sign-on data and the digital wallet data to the access control server computer 112A. In such embodiments, the wallet server computer 106 may send a message to a directory server computer 110 of FIG. 1 for routing the data to the appropriate access control server computer 112A associated with the issuer of the online banking account. The appropriate access control server computer 112A may be determined by the issuer identifier included in the single sign-on data. In addition, an indication (e.g., a flag or other data) that the current transaction originally originated from the online banking server computer 104 may be passed from the wallet server computer 106 to the access control server computer 112A.

At step 212, the access control server computer 112A may validate the transaction and the sign-on data received. Validation indicates that the access control server computer 112A recognizes the user and the payment account being used. Validation may also include determining that the transaction started through the online banking server computer 104, rather than through a merchant Website. In at least one example, the access control server computer 112A may validate the transaction by comparing the received sign-on data to stored account data associated with a user. If the receive single-sing on data matches the stored account data associated with a user, the transaction may be determined to be valid. If the received sign-on data does not match the store sign-on data, the transaction may be considered invalid and the transaction may be declined. In at least one example, the access control server computer 112A may send an authorization response message to the wallet server computer 106 to indicate the declined status of the transaction.

In conventional authentication processing, when the transaction is determined to be valid by the access control server computer 112A, the access control server computer 112A would send a request to the user computing device 102 and would ask the user to enter a password or passcode, which was previously supplied to the access control server computer 112A. However, because the user started the transaction through the online banking server computer 104, and because the online banking server computer 104 and issuer computer 112 and its access control server computer 112A are affiliated with each other, there is a level of truest associated with the transaction that does not exist when the transaction originates from a merchant computer. Accordingly, no such request is sent.

The access control server computer 112A may then send a confirmation message back the wallet server computer 106 through the secure authentication system by sending the message to the directory server computer 110, which then sends it to the wallet server computer 106. In some embodiments, the message may be in the form of a payer authentication response message. In some embodiments, the validation by the access control server computer 112A may result in a liability shift from the merchant to the issuer. Also, the access control server computer 112A may generate and include a cryptogram in the confirmation message, where the cryptogram provides proof that the access control server computer 112A verified the user's single sign on data.

In some embodiments, prior to sending the payer authentication request message, a verification enrollment request message may be sent from the wallet server computer 106 to the access control server computer 112A, and a verification enrollment response message may be returned. The verification enrollment responses and request messages indicate whether or not the user's account is enrolled in the authentication system.

At step 214, the wallet server computer 106 may receive the confirmation message from the access control server computer 112A through the secure authentication system indicating that the transaction has been validated and may proceed. In such embodiments, as the user computing device 102 was re-directed by the online banking server computer 104 to the wallet server computer 106 through the single sign-on, the transaction may proceed without the user being prompted to provide a user name or password associated with the access control server computer 112A.

At step 216, the user may complete the purchase transaction. The transaction may then proceed through a typical authorization request message and authorization response message process with a transaction amount through the acquirer computer 114 and the payment processing system 116. In such a process, referring to FIG. 1, an authorization request message may be generated by the merchant computer 108. It may include at least a transaction amount, a primary account number or payment token, and the cryptogram. After the authorization request message is generated, it is transmitted to the issuer computer 112 via the acquirer computer 114 and the payment processing system 116. The issuer computer 112 may then check to see if the user has sufficient funds and/or credit in the account being used to conduct the transaction. It also checks to see if it received the cryptogram that it previously sent during the authentication process. Once this has occurred, the issuer computer 112 then transmits an authorization response message back to the merchant computer 108 via the payment processing system 116 and the acquirer computer 114. A clearing and settlement process can subsequently occur between the acquirer computer 114, the payment processing system 116, and the issuer computer 112.

In at least one embodiment, the process described above reduces the friction that occurs in a transaction by reducing a number of times that a user will have to perform an authentication process during a web session (e.g., a session of the user with respect to the online banking server computer 104, a session of the user with respect to the merchant computer 108). In some embodiments, the user, once logged into an online banking account or merchant that is associated with a single sign-on process, may be able to proceed through a transaction process without being prompted for additional authentication data. Thus, the user's experience may be improved because the transaction will be concluded quicker when the user's utilizing a single sign-on process because the process will not be delayed by an authentication challenge after the user has utilized a single sign-on.

Figure 3:
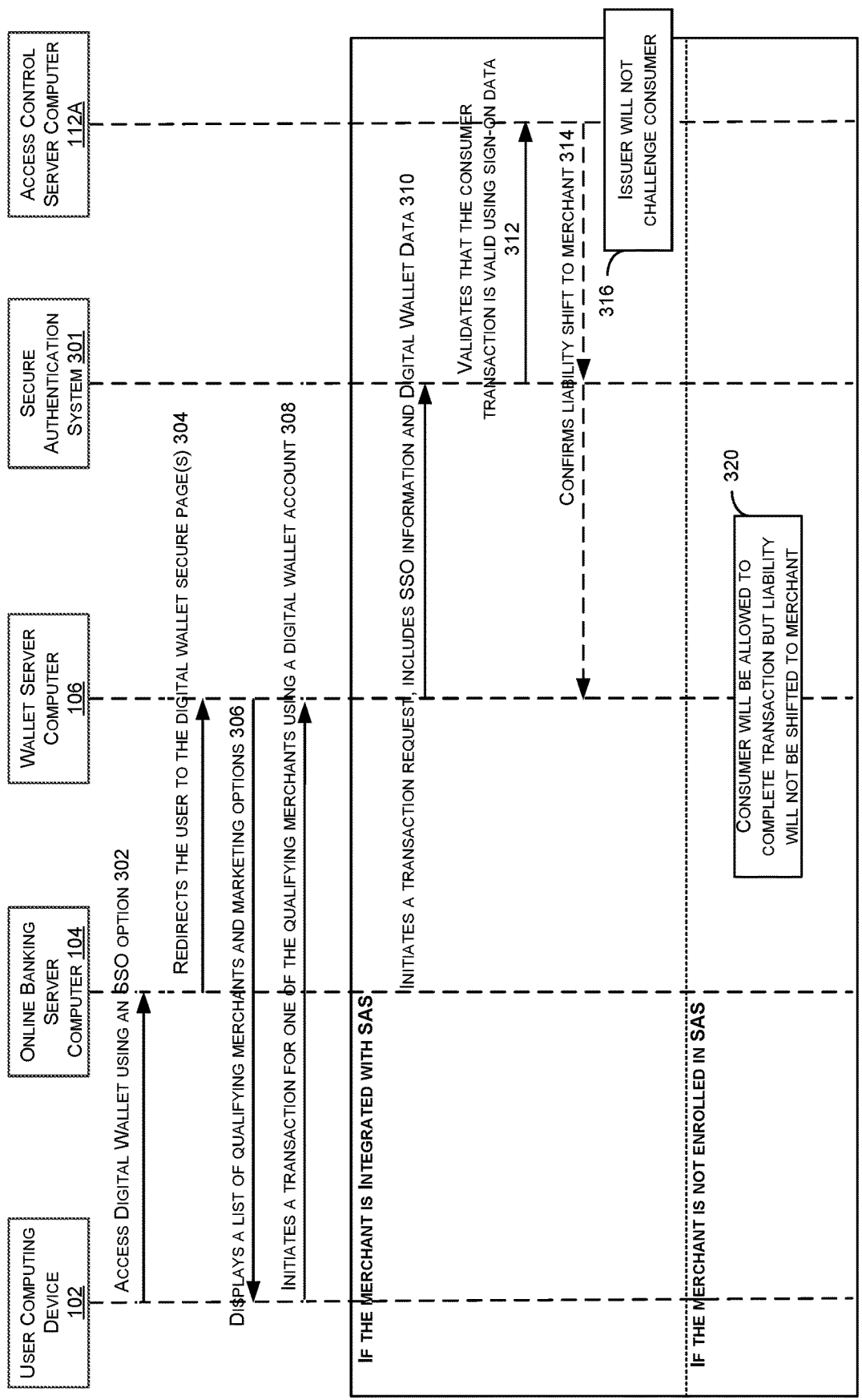
FIG. 3 shows a flow diagram showing the method of utilizing the single sign-on data to perform a transaction according to an embodiment of the invention according to an embodiment of the invention.

FIG. 3 shows a flow diagram showing the method 300 of utilizing the single sign-on to perform a transaction using a secure authentication system according to an embodiment of the invention as described with respect to FIG. 2. At step 302, a user accesses a digital wallet using an SSO option. For example, a user signs on to his online banking account via an application operating on his mobile device. The application may interact with the online banking server computer 104 to display various interfaces related to his online banking account (e.g., account main page, bill pay features, transfer funds options, etc.). For example, the online banking server computer 104 may cause an option to be displayed on the user computing device 102 that allows the user to select a single sign-on option to access his digital wallet account.

At step 304, upon receipt of an indication that the user desires to access his digital wallet account (e.g., utilizing the single sign-on option), the online banking server computer 104 may redirect the user to various digital wallet secure pages. The digital wallet secure pages may be provided and/or hosted by the wallet server computer 106 to provide one or more eCommerce web pages. At step 306, the wallet server computer 106 may cause a list of qualifying merchants and/or marketing options to be displayed on the user computing device 102 (e.g., via the browser application 102A). In other embodiments the wallet server computer 106 may cause the online banking server computer 104 to provide the list of qualifying merchants and/or marketing options via the browser application 102A or the online banking application 102B.

The user may select at least one of the marketing options (e.g., a promotional offer to buy a sweater for $29.99) associated with one of the qualifying merchants (e.g., Acme). The user may initiate a transaction through one of the qualifying merchants using a digital wallet account (e.g., as payment) at step 308. For example, the user may indicate that he wishes to purchase the item by selecting a "checkout" option and indicates that he wishes to use his digital wallet account to purchase the item. In at least one embodiment, the "checkout option" selection provides the indication that the digital wallet account is to be used for the transaction. Upon initiating a transaction that will utilize a digital wallet account, the wallet server computer 106 may cause an interface to be displayed on the user computing device 102 via the browser application 102A or the online banking application 102B. The interface may request confirmation that the user wishes to purchase the item using his digital wallet account. The user may utilize the interface to confirm that he wishes to proceed with purchasing the item using his digital wallet account.

Some merchants from which the item is being purchased may be enrolled or otherwise integrated with a secure authentication system 301 (e.g., which may include the directory server computer 110, and optionally the access control server computer 112A and the merchant plug-in module 108A of FIG. 1). If the merchant is enrolled in the secure authentication system 301, and upon the user confirming his desire to purchase an item using the digital wallet account, the wallet server computer 106 may initiate a transaction request at step 310. The transaction request may be utilized to send sign-on data and digital wallet data to the access control server computer 112A through the secure authentication system 301. The access control server computer 112A may validate that the consumer transaction is valid using the sign-on data at step 312. The access control server computer 112A may send a confirmation message to the wallet server computer 106 step 314 via the secure authentication system 301 (e.g., through the directory server computer 110). Upon receipt of the confirmation message, the wallet server computer 106 may shift liability from the issuer to the merchant. Accordingly, at step 316, the issuer will not challenge the consumer as the transaction is completed. Further details regarding steps 210, 312, and 316 were described above with respect to FIG. 2.

In the case that the merchant corresponding to the item being purchased is not enrolled with the secure authentication system 301, the consumer will not be allowed to complete the transaction at step 320. Additionally, liability will not be shifted to the issuer at step 320 because the merchant is not enrolled with the secure authentication system 301.

Figure 4:
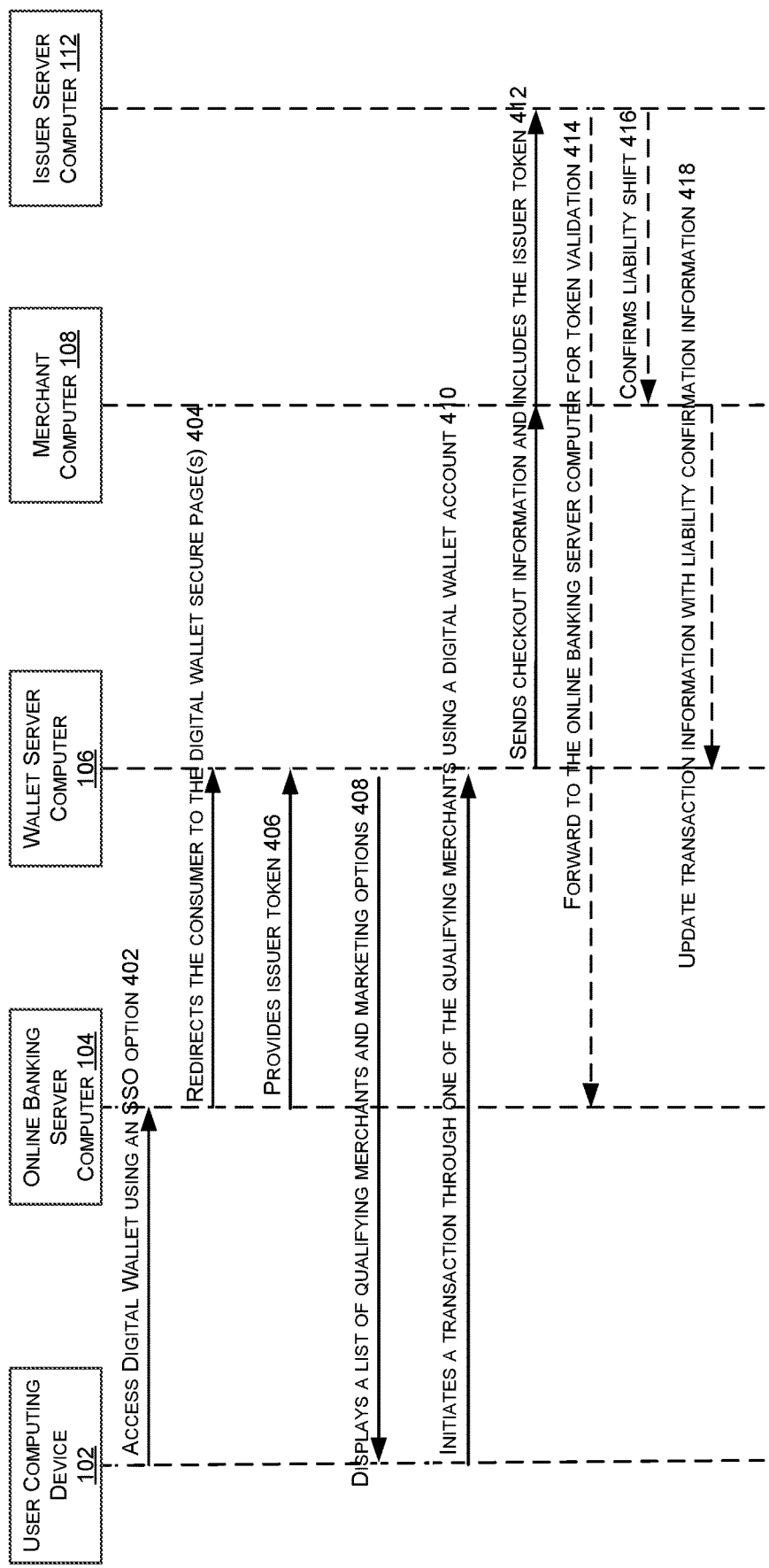
FIG. 4 shows an alternative flow diagram showing the method of utilizing the single sign-on data to perform a transaction without a secure authentication system according to an embodiment of the invention.

FIG. 4 shows an alternative flow diagram showing the method 400 of utilizing the single sign-on to perform a transaction without a secure authentication system according to an embodiment of the invention.

In step 402, the user logs into their online banking account hosted by an online banking server computer 104 and selects to access their digital wallet account using a single sign-on (SSO) option.

In step 404, the user may be redirected to one or more secure webpages associated with the wallet server computer 106. As described above, the user may access their digital wallet account using their user computing device 102. For example, the user may visit a number of online banking web pages hosted by the online banking server computer 104. The web pages may provide the user the ability to view various items/services for sale/lease from a number of merchants.

At step 406, the online banking server computer 104 (e.g., operated by a same issuer as issuer computer 112) may provide the wallet server computer 106 with an issuer token. The issuer token may include any suitable data identifying the issuer, and could be, for example, an alphanumeric identifier that is generated using a hash function. The online banking server computer 104 may be configured to maintain a unique alphanumeric identifier for each user. In at least one example, the online banking server computer 104 may store the issuer token, and an association between the issuer token and a user identifier (e.g., a username, an email address, a bank account number, etc.).

In step 408, when the user computing device 102 is redirected to the secure pages associated with the digital wallet (e.g., hosted by the wallet server computer 106), the user may be presented with a list of qualifying merchants with whom transactions may be performed using the digital wallet account.

In step 410, the user may initiate a transaction (e.g., buy a product) using the digital wallet account with one the merchants on the list of qualifying merchants. For example, the user may select a special "checkout using your digital wallet" button that is designated for purchases that are to be conducted using a digital wallet account. Upon initiation, a transaction request may be sent from the user computing device 102 to the wallet server computer 106 via the online banking server computer 104.

In step 412, the wallet server computer 106 send an authorization request message to the issuer server computer. In at least one example, the transaction authorization request message may include checkout information for the transaction (e.g., payment account number, price, user identifier, issuer identifier, a time of transaction, etc.) and the issuer token to the merchant computer 108. The authorization request message may pass through an acquirer computer and a payment processing network (not shown in FIG. 4).

In at least one example, the merchant may forward the checkout information and the issuer token to the online banking server computer 104 for validation at step 414. In at least one example, the online banking server computer 104 receives the checkout information and the issuer token from the issuer computer 112 and checks the issuer token against a stored issuer token (e.g., the stored token from step 406). The online banking server computer 104 may communicate validation results to the issuer computer 112.

If the issuer token is determined to be valid at step 414, then the issuer computer 112 may confirm a liability shift from the merchant to the issuer at step 416. Accordingly, neither the online banking server computer 104, nor the issuer computer 112, nor any other issuer-provided computing system, will challenge the user with respect to completing the transaction.

In step 418, the merchant computer 108 may send a message back to the wallet server computer updating the transaction information with the liability shift confirmation information. The transaction may then continue with the authorization request, authentication response, and settlement processing as described above with respect to FIGS. 2-3. That is, once the issuer computer 112 receives the authorization request message, it can return an authorization response message, and can later clear and settle the transaction.

1. Other Embodiments

Other embodiments of the invention may include the following:

A method for providing, by a wallet server computer, an interface associated with a wallet application, wherein the wallet server computer supports the wallet application; receiving, by the wallet server computer, an issuer-validated token identifier for a transaction; receiving, by the wallet server computer, a transaction request from a user, wherein the transaction request is for transacting with a merchant associated with the wallet application; sending, by the wallet server computer, checkout information and the issuer-validated token identifier to a merchant computer associated with the merchant; receiving, by the wallet server computer, a confirmation message from the merchant computer, wherein the wallet confirmation message authorizes the transaction request; and processing, by the wallet server computer, the transaction request based on the confirmation message. The method may further comprise receiving, by the wallet server computer, a request to access the wallet application using a single sign-on option, wherein the interface associated with the wallet application is provided in response to the request to access. Any method herein, provided by a wallet server computer, may further comprise presenting, by the wallet server computer, a list of qualifying merchants with whom transactions may be performed using a digital wallet account, wherein the transaction request is associated with a qualifying merchant of the list of qualifying merchants. In at least one embodiment, checkout information may comprise at least one of a user identifier for a user or a session identifier for a session associated with an online banking account. In at least one embodiment, single-sign data further comprises an issuer identifier for the online banking account.

A method for receiving, by an online banking server computer, an indication that a user has selected an option to create a single sign-on account for a digital wallet account; sending banking account information to a wallet server computer, wherein sending the banking account information causes the wallet server computer to create a mapping between the banking account information and the digital wallet account; receiving a transaction request from a user, wherein the transaction request is for transacting with a merchant associated with the wallet server computer; sending the transaction request to the wallet server computer associated with a digital wallet, wherein sending the transaction request to the wallet server computer causes the wallet server computer to send sign-on data to an issuer computer using a transaction authentication protocol; processing the transaction request without being challenged using the transaction authentication protocol.

A method for receiving, by a directory server computer through a wallet server application, a transaction request from a user, wherein the transaction request is for transacting with a merchant associated with wallet server computer, and wherein the transaction request is received by the wallet server application from an issuer application; sending, by the directory server computer, sign-on data to an issuer computer associated with the issuer application using a transaction authentication protocol; receiving, by the directory server computer, a confirmation message from the issuer computer, wherein the confirmation message confirms initiation through the issuer application; and sending, by the directory server computer, the confirmation message to the wallet server computer.

A method performed by the wallet server computer, may further comprise receiving, by the wallet server computer, payment account data associated with an online banking account; storing, by the wallet server computer, the payment account data; determining, by the wallet server computer, a user identifier for the user; determining, by the wallet server computer, an issuer identifier for the online banking account; and associating, by the wallet server computer, the user identifier and the issuer identifier.

B. Enhancement to Secure Authentication Using Issuer Challenge Questions

Figure 5:
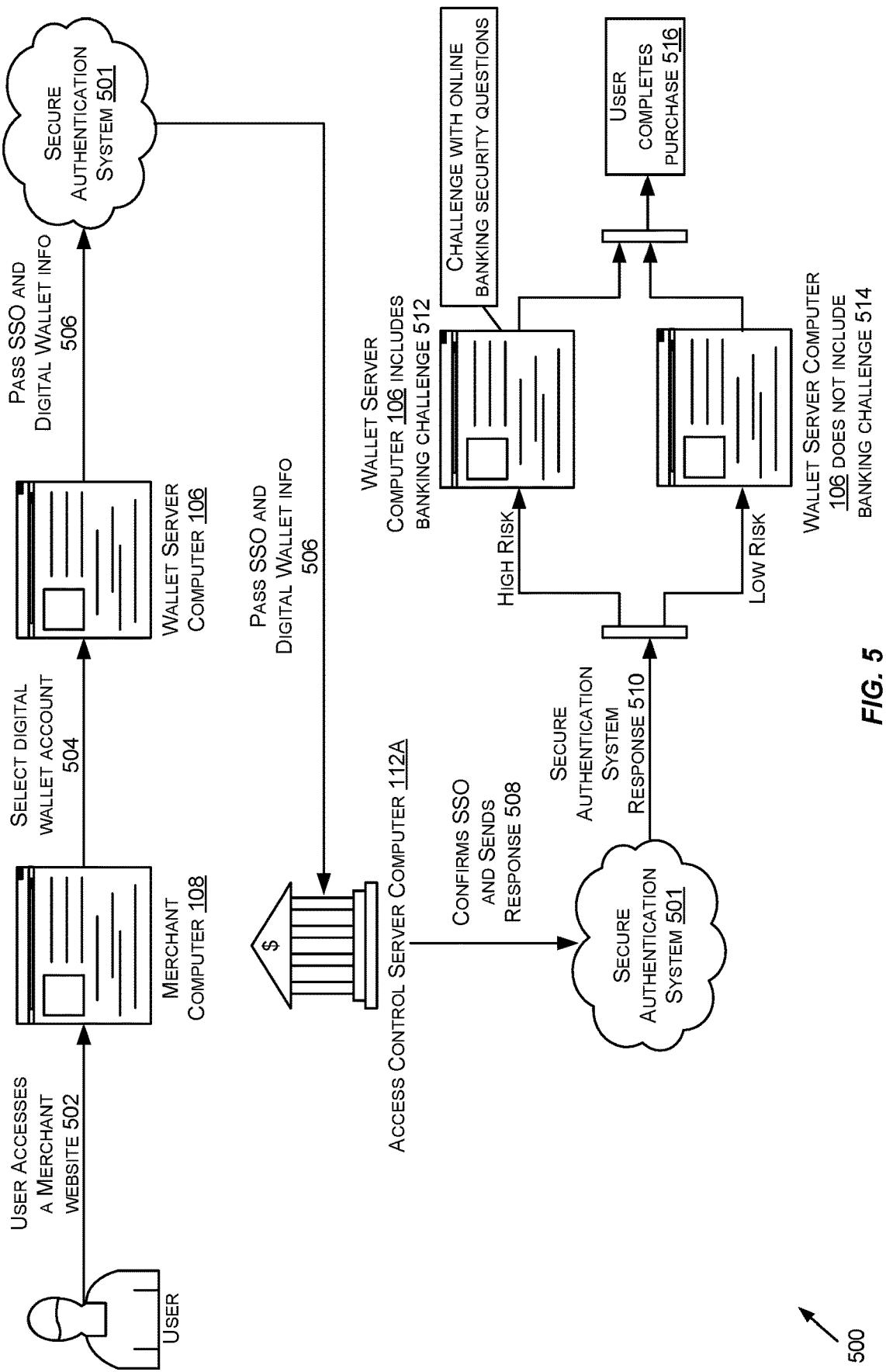
FIG. 5 shows a flow diagram of a method of utilizing issuer challenge questions to authenticate a transaction using a secure authentication system according to an embodiment of the invention.

FIG. 5 shows a flow diagram of a method 500 of utilizing issuer challenge questions to authenticate a transaction using a secure authentication system according to an embodiment of the invention. Additional methods and processes may be included within these methods and may be recognized by one of ordinary skill in the art, in light of the description below. Further, in some embodiments of the present invention, the described methods may be combined, mixed, and matched, as one of ordinary skill would recognize.

In step 502, the user accesses a merchant website hosted by, for example, the merchant computer 108 or another computing system associated with the merchant. For example, the user may access the merchant website through the browser application 102A stored on the user computing device 102. The user may also access the merchant website through a mobile application associated with the merchant stored on the user computing device 102 (not depicted).

In step 504, the user selects the digital wallet account for payment of a transaction with the merchant. For example, the user may wish to purchase a product and provides the digital wallet account as the payment source for the transaction. In some embodiments, the user may be prompted to sign into the digital wallet account using a single sign-on option provided by the wallet server computer 106. Upon signing on, sign-on data (e.g., a user's email address, a payment account number, an issuer identifier (e.g., a BIN), a merchant identifier (e.g., merchant name), an indicator for indicating that a transaction was initiated using a single sign-on option, etc. may be received by the wallet server computer 106. The sign-on data may be stored as a mapping between the wallet server computer 106, the merchant computer 108, and the access control server computer 112A. This may allow the user to perform transactions using a single sign-on process through the merchant computer 108, as well as starting from a web page hosted by the online banking server computer 104, as described above with respect to FIG. 2.

In step 506, the wallet server computer 106 sends the sign-on data (e.g., a user's email address, a payment account number, an issuer identifier (e.g., a BIN), a merchant identifier (e.g., merchant name), an indicator for indicating that a transaction was initiated using a single sign-on option, and digital wallet data (e.g., an alphanumeric identifier that uniquely identifies the digital wallet account) through a secure authentication system 501 (e.g., the secure authentication system 301 discussed in connection with FIG. 3). In such embodiments, the wallet server computer 106 may send a message to a directory server computer 110 for routing the data to the appropriate access control server computer 112A associated with the online banking account. The appropriate access control server computer 112A may be determined by the issuer identifier from the sign-on data. In at least one example the sign-on data and digital wallet data may be received by the access control server computer 112A via the secure authentication system 501. In some embodiments, the indicator included in the sign-on data may indicate that the transaction was initiated following the user logging into the merchant computer 108 (e.g., via a merchant website or mobile application operated by the merchant). Further, in some embodiments, the message that passes from the digital wallet server computer 106 to the access control server computer 112A may be a payer authentication request message. In some embodiments, prior to sending the payer authentication request message, a verification enrollment request message may be sent from the wallet server computer 106 to the access control server computer 112A, and a verification enrollment response message may be returned. The verification enrollment responses and request messages indicate whether or not the user's account is enrolled in the authentication system.

In step 508, the access control server computer 112A validates the transaction and using the sign-on data received. The validation may be an indication that the access control server computer 112A knows the user and the payment account being used. Also, in some embodiments, a cryptogram may be generated as proof that the access control server computer 112A successfully performed the validation process. The access control server computer 112A may then send the response back to the wallet server computer 106 through the secure authentication system 501 by sending the message to the directory server computer 110, the directory server computer 110 in turn sending the response to the wallet server computer 106. In some embodiments, the response may be in the form of a payer authentication response message.

In some embodiments, the access control server computer 112A performs a risk assessment of the transaction data using one or more the payment account data, the transaction data, and user data. In at least one example, the content of the response sent from the access control server computer 112A to the wallet server computer 106 may depend on the result of the risk assessment.

In step 510, the wallet server computer 106 receives the response from access control server computer 112A through the secure authentication system 501 that the transaction has been validated and may proceed. In some embodiments, where the access control server computer 112A determined that the transaction was high risk (e.g., a risk value that is greater than a threshold value), the response from the access control server computer 112A may include challenge question data (e.g., one or more challenge questions based on questions/answers associated with a banking account associated with the user).

In step 512, when the access control server computer 112A determines that the transaction is high risk, the access control server computer 112A may present the user with an issuer challenge question included in the challenge question data provided by the access control server computer 112A (e.g., "what is your mother's middle name?"). The issuer challenge question may have been previously established by the user and associated with the online banking account of the user. That is, the online banking account challenge questions may be those that challenge the user if the user is trying to log onto an online bank's website to obtain access to the user's account. Or, the questions can be used as an authentication mechanism during a credit or debit card transaction.

The issuer challenge question may be different from a user name and password associated with the digital wallet account. The issuer challenge question may be based on the user's personal data. Example issuer challenge questions may request information including the user's mother's maiden name, city of birth, address of childhood home, etc. In some embodiments, the issuer challenge question may be based on the user's transaction history. For example, the user may be presented with a list of merchant names and may be required to select the merchant where the user previously performed a transaction. As another non-limiting example, the user may be asked the amount of his last ATM withdrawal.

In step 514, when the access control server computer 112A determines that the transaction is low risk (e.g., a risk value that is less than a threshold value), the user may not be presented with a challenge question.

In step 516, the user may complete the purchase transaction. The transaction may then proceed through a typical authorization request message and authorization response message process with a transaction amount through the acquirer computer 114 and the payment processing system 116. This process is described above and the description is incorporated herein.

In at least one embodiment, reducing the frequency of challenges to users has a benefit of reducing the amount of system resources that are required to send challenge request and response messages between multiple computers systems and devices. Additionally, reducing a number of challenges presented to a user during a transaction may increase the user's satisfaction with respect to his purchasing experience. Further, because issuer online banking challenge questions are used to challenge the user, a separate repository of questions need not be maintained to authenticate payment transactions. Further, because the user is frequently uses online banking challenge questions, the user is more likely to remember the answers to these questions and are more likely to be able to answer transaction authentication challenges. This is compared to systems which would otherwise require the user to remember one set of challenge questions for transactions and another for online banking account access.

Figure 6:
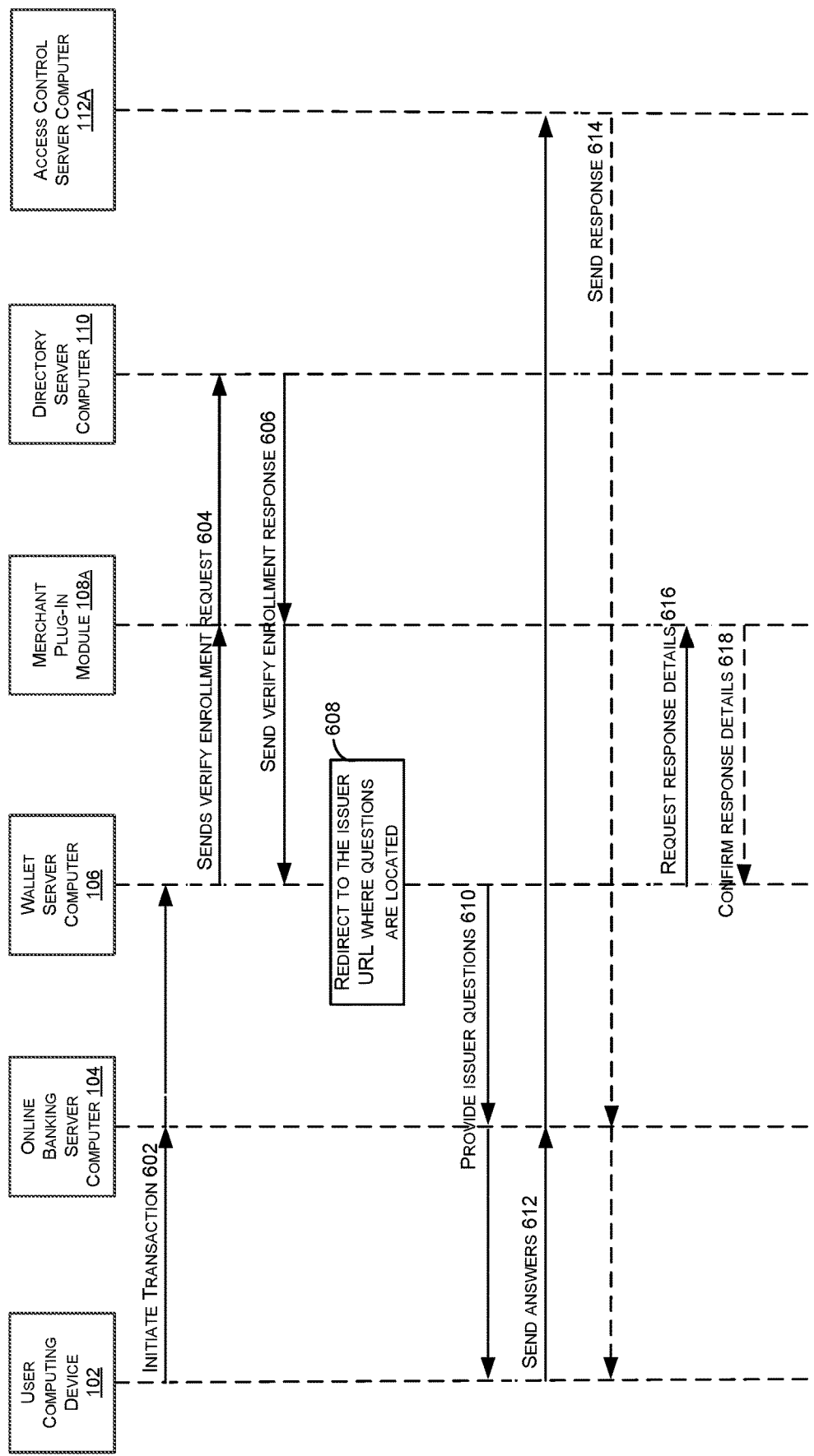
FIG. 6 shows an alternative flow diagram of the method of utilizing issuer challenge questions to authenticate a transaction using the secure authentication system according to an embodiment of the invention.

FIG. 6 shows an alternative flow diagram of a method 600 of utilizing issuer challenge questions to authenticate a transaction using the secure authentication system according to an embodiment of the invention.

At step 602, the user initiates a transaction using a digital wallet account associated with a wallet server computer 106. In at least one embodiment, the user may initiate a transaction via the user computing device 102 (e.g., using browser application 102A or online banking application 102B). A payer authentication request message may be received by the wallet server computer 106, via the online banking server computer 104. In at least one example, the payer authentication request message may include purchasing information (e.g., a purchase price, a merchant identifier (name), a payment account number, an issuer identifier (e.g., BIN), an user identifier (e.g., an email address) and a digital wallet identifier (e.g., an alphanumeric identifier that uniquely identifies the digital wallet account being used for the transaction).

In step 604, the wallet server computer 106 generates and sends a verify enrollment request (VEReq) message to a merchant computer 108. The VEReq message may include a payment account identifier (e.g., a number associated with a payment account) corresponding to the user. In some embodiments, the VEReq message may be received and sent by a merchant plug-in module 108A associated with the merchant computer 108, which may function as a proxy between the merchant computer 108 and the directory server computer 110 and/or the access control server computer 112A. The merchant plug-in module 108A may then route the VEReq message to the directory server computer 110.

The directory server computer 110 may verify the payment account presented for the transaction as being enrolled in the secure authentication system. In other embodiments, the directory server computer 110 may communicate with the access control server computer 112A to determine whether or not the payment account presented is enrolled in the secure authentication system. The directory server computer 110 may determine enrollment based on the payment account number or a card range for a particular issuer associated with the payment account number. When the directory server computer 110 determines the access control server computer 112A associated with the payment account, the directory server computer 110 may request or access a database including URL's for issuer challenge question stored by the access control server computer 112A.

The directory server computer 110 may then generate and send a verify enrollment response (VERes) message indicating whether the user is enrolled. The VERes may include a URL (e.g., web address) for the access control server computer 112A where the issuer challenge questions are stored and accessible. At step 606, the VERes message may be routed back to the wallet server computer 106 from the directory server computer 110 via the merchant plug-in module 108A.

At 608, the wallet server computer 106 re-directs the user's browser to the URL provided in the VERes to present the user with the issuer challenge questions at step 610.

In step 612, the user sends a response to the issuer computer with the answer to the issuer challenge question. In some embodiments, the response may be sent via a connection between the user computing device 102 and the access control server computer 112A. In other embodiments, the response may be sent to access control server computer 112A through the wallet server computer 106 and the directory server computer 110.

In step 614, the access control server computer 112A may send a response message back to the user computing device 102 indicating whether the answer provided by the user was correct. In some embodiment, the access control server computer 112A may send the response message back to the user computing device 102 via the online banking server computer 104.

In step 616, the wallet server computer 106 may send a message to the merchant plug-in module 108A indicating the result of the authentication process performed between the user computing device 102 and the access control server computer 112A. The message may request that the transaction proceed where the authentication process was successfully performed.

In step 618, the merchant plug-in module 108A sends a message to the wallet server computer 106 confirming the results of the authentication process. The transaction may then proceed through a payment authorization process as described above.

Embodiments of the present invention may provide the user with the ability to be challenged using banking questions that the user-previously specified. Using previously-specified banking questions consolidates the number of "secrets" a user must remember. Additionally, as banking questions are often more easily-recallable to a user than a PIN, utilizing banking questions may provide the user with a greater likelihood of being authenticated a first time rather than having to enter multiple passwords during various attempts to remember a PIN.

C. Interface

Figure 7:
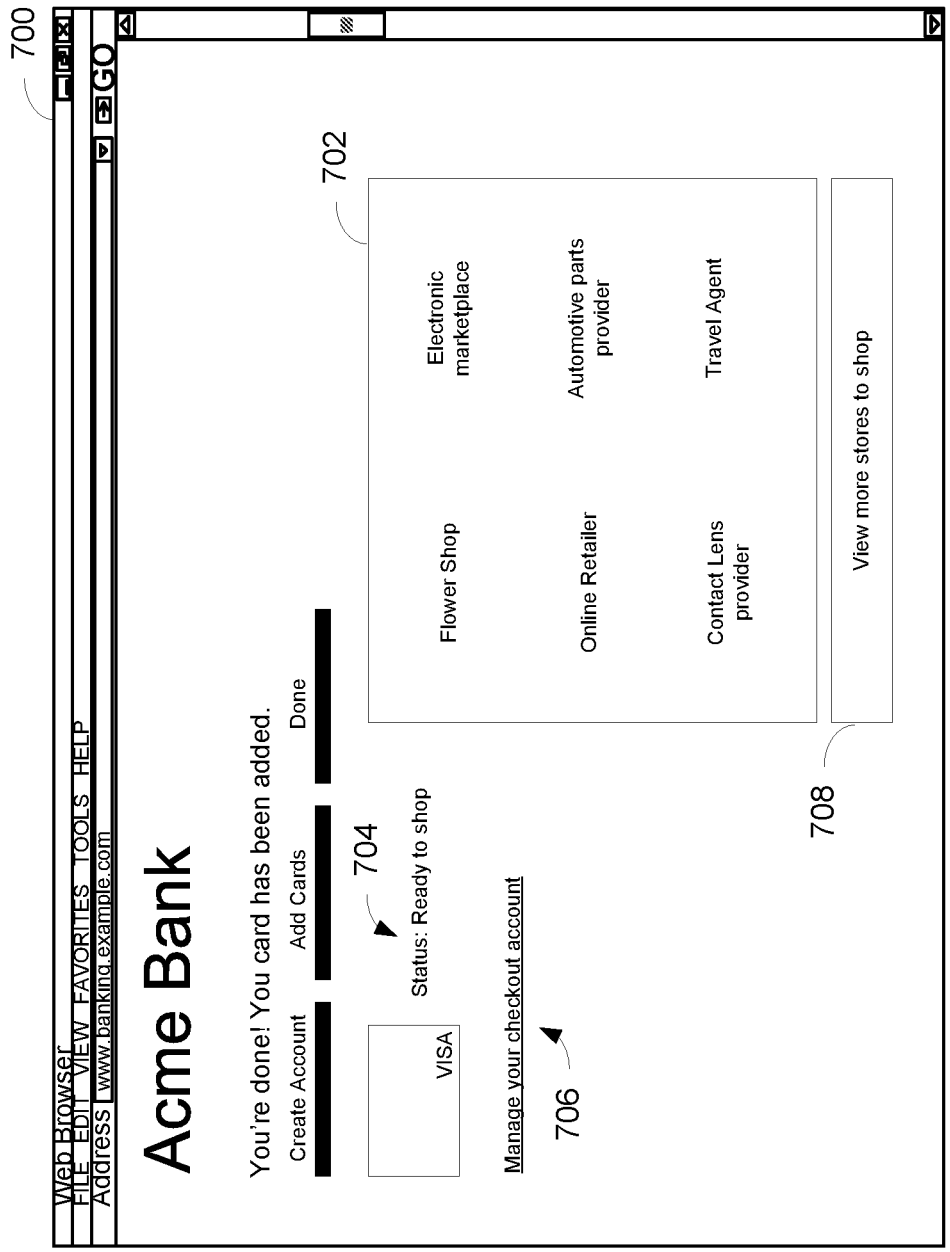
FIG. 7 shows an exemplary interface for providing a list of qualifying merchants in accordance with at least one embodiment of the invention.

FIG. 7 shows an exemplary interface 700 for providing a list of qualifying merchants 702 in accordance with at least one embodiment of the invention. The interface may be provided by the online banking server computer 104, operated by an issuer, in this case, "Acme Bank." As described above, a user may access his banking account online in order to create an digital wallet account via the online banking account website. In accordance with the methods described above, the user may link his banking account to the digital wallet account, enabling the banking account to be used for payment processing for transactions utilizing the digital wallet account. Upon linking the banking account to the digital wallet account, a status may be presented to the user at 704 indicating that the user is ready to shop. The user, at any suitable time, may manage his or her digital wallet account by selecting, for example, hyperlink 706.

A list of qualifying merchants 702 may be provided. The list of qualifying merchants 702 may include merchants for which there is a previously-determined agreement between an issue (e.g., Acme Bank) and the merchant to provide information of the merchant (e.g., hyperlinks, item offered for purchase by the merchant, etc.) on the website hosted by online banking server computer 104 and including interface 700. The list of qualifying merchants 702 may be presented in the manner depicted in FIG. 7 or may be depicted in another suitable manner. The user may select a merchant of the list of qualifying merchants 702. Upon selection, the online banking server computer 104 may redirect the user to the secure pages of the merchant in accordance with the methods discussed above. The user may be provided an option to view additional merchants of the list of qualifying merchants by selecting, for example, the button 708. Upon selection of button 708, the user may be presented, via the interface 700 or another interface provided by the online banking server computer 104, one or more additional merchants of the list of qualifying merchants 702. Upon selecting a merchant, the user may be presented with one or more goods and/or services that the user may obtain from the merchant upon purchase completion.

D. Other Embodiments

Other embodiments of the invention may include the following:

A method for receiving, by a wallet server computer, a transaction request from a user, the transaction request is for a transaction between a merchant and a user; sending, by the wallet server computer, a verify enrollment request message to a merchant computer associated with the merchant; receiving, by the wallet server computer from the merchant computer, a verify enrollment response message; and redirecting, by the wallet server computer, the user to a webpage of an issuer, wherein the webpage provides one or more challenge questions associated with an online banking account associated with the user.

A method for receiving, by a merchant computer, a verify enrollment request message to a merchant computer associated with the merchant; sending, by the merchant computer, the verify enrollment request message to a directory server computer using a transaction authentication protocol; receiving, by the merchant computer from the directory computer, a verify enrollment response message; receiving, by the merchant computer, a request for details associated with the verify enrollment response message; and providing, by the merchant computer, the details associated with the verify enrollment response message to a wallet server computer.

A method for receiving, by an issuer computer, a payer authentication request message for a transaction between a user and a merchant; providing one or more banking questions to a user through a user computer device, the one or more banking questions being associated with an online banking account; receiving, by the issuer computer, one or more responses to the one or more banking questions; authenticating, by the issuer computer, the user based on the one or more responses to the one or more banking questions; and sending, by the issuer computer, a payer authentication response to a directory server computer.

III. Technical Benefits

Embodiments of the present invention may also provide for faster transaction processing as it reduces the friction that occurs in transactions where users are required to perform multiple authentication processes to perform the transaction. In some embodiments, the user, once logged into an online banking account or merchant that is associated with a single sign-on process, may be able to proceed through a transaction process without being prompted for additional authentication data. In addition, in embodiments where additional authentication data may be requested, the authentication data may be issuer challenge questions that would typically be easier for a user to recall than a typical user name and password.

Reducing the frequency of challenges to users also has the benefit of reducing the amount of system resources required to send challenge request and response messages between multiple computers systems and devices.

IV. Example Computer Systems

The various participants and elements described herein may operate one or more computer apparatuses to facilitate the functions described herein. Any of the elements in the above-described FIG. 1, including any servers or databases, may use any suitable number of subsystems to facilitate the functions described herein.

Figure 8:
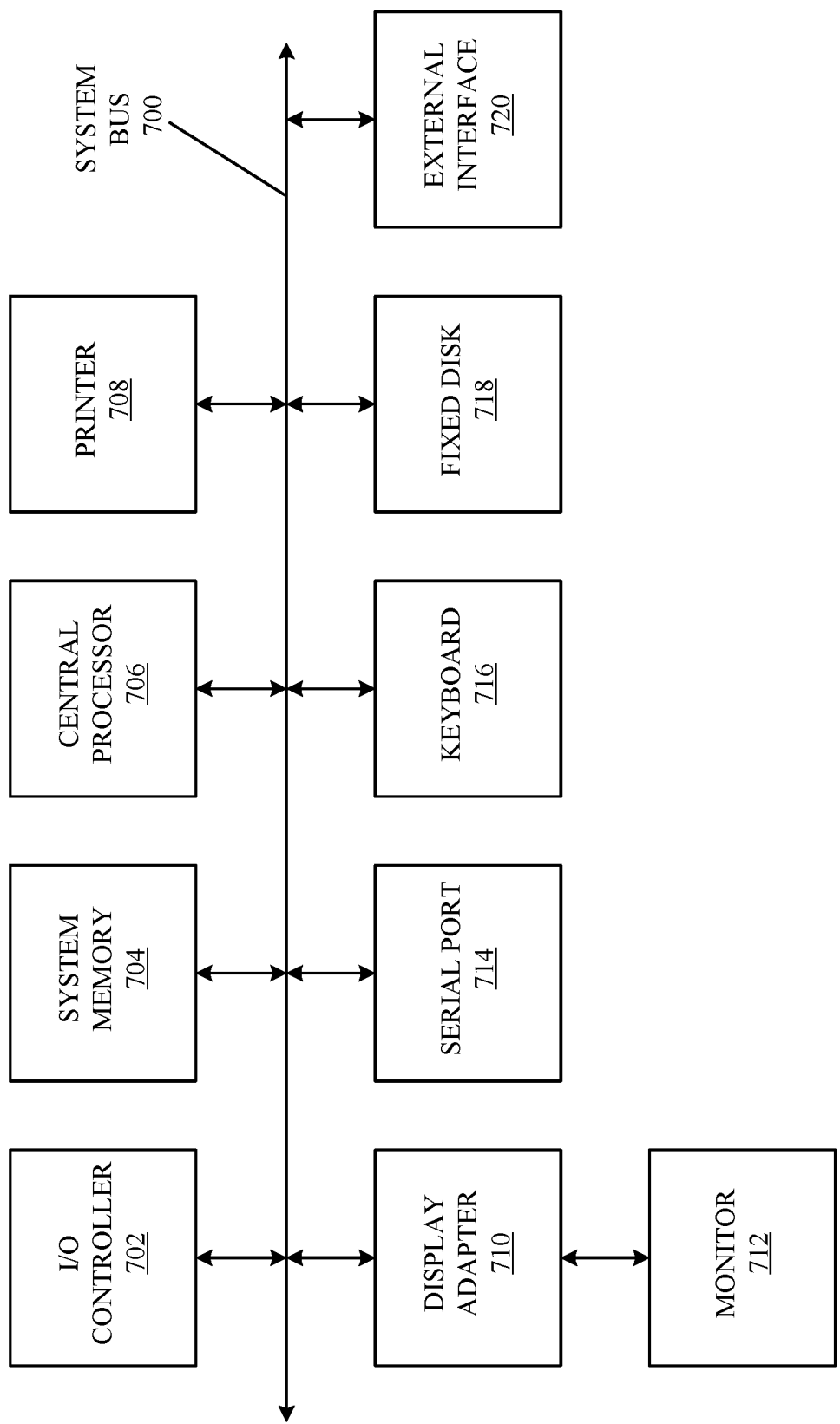
FIG. 8 shows an exemplary block diagram of a computer system.

Examples of such subsystems or components are shown in FIG. 8. The subsystems shown in FIG. 8 are interconnected via a system bus 800. Additional subsystems such as a printer 808, keyboard 816, fixed disk 818 (or other memory comprising computer readable media), monitor 812, which is coupled to display adapter 810, and others are shown. Peripherals and input/output (I/O) devices, which couple to I/O controller 802 (which can be a processor or other suitable controller), can be connected to the computer system by any number of means known in the art, such as serial port 814. For example, serial port 814 or external interface 820 can be used to connect the computer apparatus to a wide area network such as the Internet, a mouse input device, or a scanner. The interconnection via system bus allows the central processor 806 to communicate with each subsystem and to control the execution of instructions from system memory 804 or the fixed disk 818, as well as the exchange of information between subsystems. The system memory 804 and/or the fixed disk 818 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method, comprising:
   managing, by an online banking server computer operated by or on behalf of an issuer, an online banking website providing i) display access to banking account data provided by the issuer of a banking account maintained by the issuer and associated with a user and ii) at least one interface for initiating a transaction with a merchant;
   obtaining, by the online banking server computer from a user device, sign-on data for accessing the banking account online;
   obtaining, by a wallet server computer from the online banking server computer associated with the issuer, the sign-on data obtained by the online banking server computer from the user device;
   receiving, by the wallet server computer from the online banking server computer, a transaction request associated with the banking account and initiated via the online banking website;
   sending, by the wallet server computer to the issuer computer associated with the issuer, the sign-on data initially obtained by the online banking server computer and an indication that the transaction request was initiated by the online banking server computer;
   in response to receiving the indication that the transaction request was initiated through the online banking server computer;
      authenticating, by the issuer computer, the user based on matching the sign-on data initially obtained by the online banking server computer to stored account data maintained by the issuer and associated with the banking account of the user, the authenticating being conducted without the issuer computer prompting the user for input;
      validating, by the issuer computer, that the transaction request was initiated through the online banking server computer based on the indication; and
      determining, by the issuer computer, that additional user authentication is not required based on the validating that the transaction request was initiated through the online banking server computer;
   receiving, by the wallet server computer from the issuer computer, a confirmation message comprising an additional indicator indicating that the sign-on data has been authenticated by the issuer computer;
   in response to receiving the additional indicator, executing, by the wallet server computer, the transaction request without the wallet server computer prompting the user for the additional user authentication.

2. The method of claim 1, further comprising:
   receiving, by the wallet server computer, user account information for a digital wallet account, wherein the user account information comprises payment account information for the user;
   creating, by the wallet server computer, the digital wallet account for the user in response to receiving the user account information comprising the payment account information associated with the banking account; and
   associating, by the wallet server computer, the payment account information with the digital wallet account for the user.

3. The method of claim 1, further comprising:
   receiving, by the wallet server computer, a request to create a digital wallet account; and
   generating, by the wallet server computer, an association between the banking account and the digital wallet account, wherein the sign-on data to be sent to the issuer computer is retrieved based at least in part on the association between the banking account and the digital wallet account.

4. The method of claim 3, wherein the sign-on data comprises at least one of a user identifier for the user or a session identifier for a session associated with the banking account, and wherein the sign-on data further comprises an issuer identifier for the banking account.

5. The method of claim 1, further comprising:
   sending, by the wallet server computer, digital wallet data to the issuer computer, wherein the digital wallet data further comprises a digital wallet identifier.

6. A system, comprising:
   an online banking server computer;
   a wallet server computer; and
   an issuer computer;
   wherein, the online banking server computer is programmed to:
      i) obtain, from a user device, sign-on data for accessing a banking account maintained by an issuer and associated with a user via an online banking website;
      ii) manage the online banking website and provide display access to banking account data of the banking account; and
      iii) provide at least one interface for initiating a transaction with a merchant;
   wherein the wallet server computer is programmed to:
      obtain, from the online banking server computer the sign-on data for accessing the banking account of the user;
      receive, from the online banking server computer, a transaction request associated with the banking account and initiated by the online banking server computer;
      send, to the issuer computer, the sign-on data initially obtained by the online banking server computer, the sign-on data comprising an indicator that indicates the transaction request was initiated through the online banking server computer;
      receive, from the issuer computer, a confirmation message comprising an additional indicator that the sign-on data has been authenticated by the issuer computer; and
      execute, based on the additional indicator, the transaction request without prompting the user for additional user authentication;
   wherein the issuer computer is programmed to:
      authenticate the user based on matching the sign-on data initially obtained by the online banking server computer to stored account data maintained by the issuer and associated with the banking account of the user, the authenticating being conducted without prompting the user for input based on receiving the indicator indicating the transaction request was initiated through the online banking server computer;
      validate that the transaction request was initiated through the online banking server computer based on the indicator; and determine that additional user authentication is not required based on the validating that the transaction request was initiated through the online banking server computer.

7. The system of claim 6, wherein the wallet server computer is further configured to:
receive user account information for a digital wallet account, wherein the user account information comprises payment account information for the user;
create the digital wallet account for the user; and
associate the payment account information with the digital wallet account for the user.

8. The system of claim 6, wherein the wallet server computer is further configured to:
receive a request to create a digital wallet account;
generate an association between the banking account and the digital wallet account; and
retrieve the sign-on data utilizing the association.

9. The system of claim 8, wherein the sign-on data comprises at least one of a user identifier for the user or a session identifier for a session associated with the banking account, and wherein the sign-on data further comprises an issuer identifier for the banking account.

10. The system of claim 6, wherein the wallet server computer is further configured to:
send digital wallet data to the issuer computer, wherein the digital wallet data further comprises a digital wallet identifier.

11. The method of claim 1, wherein the confirmation message from the issuer computer is received in a payer authentication response message.

12. The method of claim 5, wherein sending the sign-on data and the digital wallet data to the issuer computer utilizes a secure authentication system and a payer authentication request.

13. The method of claim 12, wherein sending the sign-on data and the digital wallet data to the issuer computer causes the issuer computer to validate the transaction request.

14. The method of claim 13, wherein validating the transaction request comprises comparing the sign-on data to stored account data associated with the user.

15. The system of claim 6, wherein the confirmation message from the issuer computer is received in a payer authentication response message.

16. The system of claim 10, wherein sending the sign-on data and the digital wallet data to the issuer computer utilizes a secure authentication system and a payer authentication request.

17. The system of claim 16, wherein sending the sign-on data and the digital wallet data to the issuer computer causes the issuer computer to validate the transaction request.

18. The system of claim 17, wherein validating the transaction request comprises comparing the sign-on data to stored account data associated with the user.

\* \* \* \* \*